United States Patent Office 3,560,484
Patented Feb. 2, 1971

3,560,484
PROCESS FOR THE PREPARATION
OF ε-CAPROLACTAM
Ikuzo Tanaka, Hideo Uehara, Hukue Osaki, and Masa-
 yuki Yamagata, Tokyo, Japan, assignors to Teijin
 Limited, Osaka, Japan, a corporation of Japan
No Drawing. Filed June 17, 1969, Ser. No. 834,173
Claims priority, application Japan, June 21, 1968,
 43/42,971; Aug. 1, 1968, 43/54,498, 43/54,499;
 Nov. 4, 1968, 43/80,545; Nov. 5, 1968, 43/81,166
Int. Cl. C07d 41/06
U.S. Cl. 260—239.3  11 Claims

ABSTRACT OF THE DISCLOSURE

ε-Caprolactam is prepared in a single step without formation of by-product ammonium sulfate by contacting 2-nitrocyclohexanone and/or 2-nitrocyclohexen-1-ol with hydrogen at a temperature ranging from 150° to 300° C. in the presence of a liquid medium such as water, alcohols, ethers, benzene or mixtures thereof and of an active hydrogenation catalyst, preferably in the further presence of a nitrogen-containing basic substance such as ammonia.

This invention relates to a novel process for the preparation of ε-caprolactam.

More particularly, the invention relates to a process for the preparation of ε-caprolactam from 2-nitrocyclohexanone and/or an enol form isomer thereof (i.e., 2-nitrocyclohexene-1-ol).

ε-Caprolactam is an important compound as the starting material of 6-nylon which is widely utilized as synthetic fiber and resin. Accordingly, the preparation of ε-caprolactam has been the subject of intensive studies.

The object of the present invention is to provide a novel process for the preparation of ε-caprolactam of such industrial importance, with industrial ease and low cost.

Many processes are known for the preparation of ε-caprolactam, most of which utilizing Beckmann rearrangement reaction of cyclohexanone oxime. Although Beckmann rearrangement is admittedly an industrially valuable means, it is normally practiced under sulfuric acid-acidified condition and the reaction product must be neutralized with ammonia. Consequently, a large amount of ammonium sulfate is produced as by-product in the reaction system during the neutralization. Thus disposal of the ammonium sulfate must always be considered in the preparation of ε-caprolactam. In view of the present status of the fertilizer industry in which the supply far exceeds the demand, this inevitable ammonium sulfate formation will increasingly become a detrimental factor in the nylon industry. Thus development of a novel preparation method of ε-caprolactam free from the by-product formation of ammonium sulfate has been urgently desired.

As a method free of ammonium sulfate formation, for example, synthesis of ε-caprolactam from ε-caprolactone is known (U.S. Pat. No. 3,000,880). However this process contains a problem in the preparation of starting material, and its applicability to commercial practice is somewhat dubious.

We have been engaged in the research work from entirely novel standpoint for the purpose of overcoming the deficiencies inherent in the conventional processes, and, as the result, discovered that ε-caprolactam can be easily prepared from 2-nitrocyclohexanone and/or an enol form isomer thereof, i.e., 2-nitrocyclohexene-1-ol.

Thus, according to the present invention, ε-caprolactam can be prepared by contacting 2-nitrocyclohexanone and/or 2-nitrocyclohexene-1-ol with hydrogen at temperatures ranging from 150° C. to 300° C., in the presence of at least one liquid medium selected from the group consisting of water, lower aliphatic alcohols, ethers of 4–8 carbons, and aromatic hydrocarbons of 6–10 carbons, and an active hydrogenation catalyst, and by recovering ε-caprolactam from the resulting reaction mixture.

The process of this invention can be ultimately expressed by a reaction formula as follows:

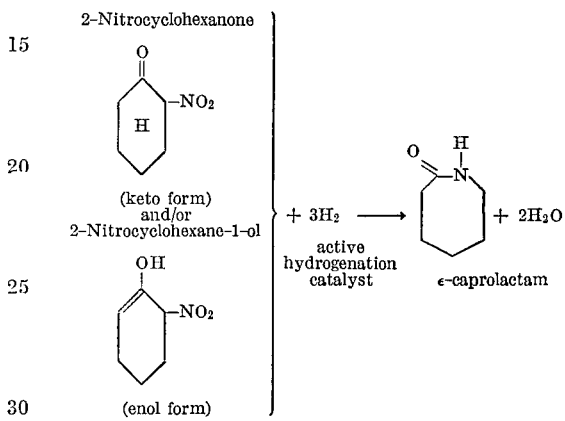

2-nitrocyclohexanone which is used as the starting material in the subject process can be easily prepared, for example, by the steps of reacting acetic anhydride with conc. nitric acid, reacting the resulting acetyl nitrate with 1-acetoxycyclohexene [The Journal of Organic Chemistry, vol. 31, 357 (1966)]. It may also be prepared by treating cyclohexene with acetic anhydride-conc. nitric acid system, and oxidizing the reaction product with an oxidizing agent such as chromic anhydride [Journal of American Chemical Society, vol. 82, 3588 (1960); The Journal of Chemical Society, 1100 (1946); The Journal of Organic Chemistry, vol. 27, 2322 (1962); ibid., vol. 27, 3049 (1962); ibid., vol. 28, 1765 (1963)]. The reaction products of those processes are normally mixtures of keto form 2-nitrocyclohexanone and enol form isomer thereof. In most cases, the content of keto form is the higher in the mixtures.

We discovered that on refining the so obtained 2-nitrocyclohexanone, keto form is maintained during recrystallization, but a part or most of the keto form is converted to enol form during heating or distillation, as indicated by the formula below. Furthermore we observed that the enol form is again converted back to keto form, when the enol form isomer is allowed to stand at low temperatures.

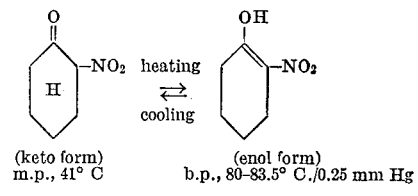

(keto form)   (enol form)
m.p., 41° C   b.p., 80–83.5° C./0.25 mm Hg

The relationship between the atomic groups contained in 2-nitrocyclohexanone and the wave number indicating their characteristic absorptions as confirmed with infrared absorption spectrum analysis of these isomers is as follows:

| Atomic group | Wave Number showing characteristic absorption |
|---|---|
| $\diagdown\!\!\!\!\diagup\!\!\!\text{C}=\text{O}$ (keto form) | 1,733 cm.$^{-1}$ |
| $\diagup\!\!\!\text{NO}_2$ (keto form) | 1,555 cm.$^{-1}$ |
| $\diagdown\!\!\!\!\diagup\!\!\!\text{C}=\text{C}\diagdown$ (enol form) | 1,610 cm.$^{-1}$ |
| $\diagdown\!\!\!\!\diagup\!\!\!\text{C}=\text{C}\diagup\!\!\!\!^{\text{H}}_{\text{NO}_2}$ (enol form) | 1,510 cm.$^{-1}$ |

Accordingly, the reversible conversion between keto form and enol form can be confirmed by measuring the intensity variation at the wave number showing the above characteristic absorption, with infrared absorption spectrum analysis.

Also the quantitative relation between the keto form and enol form compounds can be more precisely determined by measuring their nuclear magnetic resonance spectrum and calculating the area ratio of the hydrogen atoms on the carbon to which the nitro group is bonded (4.5–5.0η), to the hydrogen atoms of the hydroxyl group of the enol (—3.9η).

After repetitive analyses according to the above-described various measuring methods, we discovered that both keto form; 2-nitrocyclohexanone and its enol form isomer; 2-nitrocyclohexene-1-ol, as well as their mixtures, can be equally utilized as the starting material and are useful in the subject process for the preparation of ε-caprolactam.

So far as we know, there has been no attempt of direct hydrogenation of 2-nitrocyclohexanone (keto form) and/or 2-nitrocyclohexene-1-ol (enol form) in the past.

We studied the direct hydrogenation of said keto form and/or enol form compounds from various angles, and discovered that substantially no ε-caprolactam is formed by catalytic hydrogenation of the compounds using hydrogen when it is practiced in glacial acetic acid solvent which is conventionally employed in ordinary catalytic hydrogenation. Furthermore we discovered that, if the catalytic hydrogenation is practiced at specific temperature ranges and in a specific liquid medium, ε-caprolactam can be directly formed in the reaction mixture.

According to the present invention, said specific temperature ranges 150°–300° C., the range of 200–280° C. being particularly preferable. As the specific liquid medium, any of the following can be used:

(a) water
(b) lower aliphatic alcohols
(c) ethers of 4–8 carbons
(d) aromatic hydrocarbons of 6–10 carbons, and
(e) mixtures of two or more liquids of foregoing (a) through (d).

All of the above-named are good solvents of ε-caprolactam to be formed. As the liquid medium, any normally and industrially usable water can be used as the group (a). The lower aliphatic alcohols of group (b) include, for example, monovalent lower aliphatic alcohols such as methanol, ethanol, n-propyl alcohol, isopropyl alcohol, butanol, etc.; and divalent lower aliphatic alcohols such as ethylene glycol, 1,2-propylene glycol, etc. Among the above-named, mono- and di-valent lower aliphatic alcohols of 1–3 carbons, inter alia, methanol, are particularly preferred. The ethers of group (c) include aliphatic ethers such as di-isopropyl ether, dibutyl ether, etc., and cyclic ethers such as tetrahydrofuran, dioxane, etc. Cyclic ethers of 4 carbons such as tetrahydrofuran, dioxane, and the like are particularly preferred. Incidentally, ethyl ether is objectionable in that its boiling point is too low. The aromatic hydrocarbons of 6–10 carbons of group (d) include, for example, benzene, toluene, o-, m-, and p-xylene, ethylbenzene, pseudocumene, etc., particularly the aromatic hydrocarbons of 6–8 carbons such as benzene, toluene, and mixed xylenes being preferred.

According to the invention, it is also possible to use various mixtures of the foregoing, such as aqueous solutions of above (b) or (c), for example, aqueous solutions of methanol, ethanol, dioxane, etc.; mixtures of water with solvents of (d), for example, water-benzene mixture; liquid mixture of (b) and (c), for example, methanol-dioxane mixture; liquid mixture of (b) and (d), for example, methanol-benzene mixture; and liquid mixture of (c) and (d), for example, dioxane-benzene mixture.

The (a) water may be a slightly acidic aqueous solution of pH down to 3, preferably on the order of pH 4.5. Or, as described later, a nitrogen-containing basic substance such as ammonia, aqueous ammonia, etc., may be added to the liquid medium according to the invention. Consequently, alkaline aqueous solutions of pH up to approximately 13 may also be used. The above description also applies when aqueous methanol or dioxane solution as mentioned in the above is used as the liquid medium. Those liquid media are normally used within the range of 2–100 parts by weight, preferably 4–30 parts by weight, per weight part of the starting material.

The reaction of the invention is effected by contacting 2-nitrocyclohexanone (keto form) and/or 2-nitrocyclohexane-1-ol (enol form) as the starting material with hydrogen gas at temperatures ranging from 150° to 300° C., preferably 200° to 280° C. as aforesaid, in the presence of a liquid medium as above-described and an active hydrogenation catalyst. The amount of hydrogen to be used in the reaction should be at least 3 mols per mol of the starting material, i.e., 2-nitrocyclohexanone and/or 2-nitrocyclohexene-1-ol. Normally, the preferred amount ranges from 4 to 8 mols per mol of the starting material, but the use of greater amount has no detrimental effect. The partial pressure of hydrogen in the reaction system is not critical, but normally at least one atmosphere as the partial pressure of hydrogen is preferred. Excessively high pressures are disadvantageous in view of the equipment required and difficulties in handling, although the reaction rate normally increases under higher partial pressure of hydrogen. Normally, preferred partial pressure of hydrogen ranges 1–50 atmospheres, particularly 1–20 atmospheres. The total pressure within the reaction system is provided by, besides the partial pressure of hydrogen, vapor pressure of the liquid medium and starting material. The total pressure preferably ranges from approximately 4 to 200 atmospheres (as absolute pressure).

Any hydrogenation catalyst which shows activity in the catalytic reducing reaction intended by the present invention at temperature below 300° C. can be used as the active hydrogenation catalyst in the present invention. Usually, such catalyst can be chosen from hydrogenation catalysts capable of reducing a nitro group to an amino group. As such catalysts, hydrogenation catalysts consist of metals of Group VIII of the periodic table including iron (Fe), cobalt (Co), nickel (Ni), ruthenium (Ru), rhodium (Rh), palladium (Pd), platinum (Pt), iridium (Ir), and osmium (Os), and of compounds of such metals which can form the metals under the reaction conditions employed in the invention (hereinafter this provision will be briefly referred to as "which can form the metals in the reaction system.") may be named. Among the foregoing, particularly at least one metal selected from the group consisting of nickel, cobalt, palladium and platinum, or at least one compound of these metals is suitable. For example, nickel-containing hydrogenation catalysts such as reduced nickel, Raney nickel, stabilized nickel, Urushibara nickel, nickel boride, nickel formate, nickel oxalate, etc.; cobalt-containing hydrogenation catalysts such as reduced cobalt, Raney cobalt, cobalt boride, Urushibara cobalt, cobalt formate, etc.; palladium-containing catalysts such as palladium black, palladium sponge, palladium oxide, palladium-carbon, paladium hydroxide, colloidal palladium, palladium chloride, palladium skeleton catalyst, etc.; and platinum-containing hydrogenation catalysts such as platinum black, platinum sponge, platinum oxide, colloidal platinum, platinum skeleton catalyst, platinum-carbon, etc.; are used with preference. Preferred catalysts consist of Group VIII metals or compounds thereof besides the foregoing include, for example, colloidal rhodium, rhodium-carbon, colloidal iridium, iridium black, iridium-carbon, iridium dioxide, ruthenium dioxide, ruthenium-carbon, Raney iron, osmium black and osmium-carbon. Besides the above, Raney copper, copper chromite catalyst, etc. can also be used. It is also permissible to use combination of two or more of the foregoing components as the catalyst system, such as platinum-applied Raney nickel, cobalt or manganese-added copper chromite catalyst or rhodium-platinum catalyst, etc., or additionally to use other metal or metallic compound having promoting effect to the foregoing catalyst, such as addition of manganese to the copper chromite catalyst.

Other suitable catalysts not exemplified above may be determined by conducting preliminary experiments at temperature below 300° C.

The amount of the catalyst is not particularly critical, but normally it is sufficient to use no more than 50 wt. percent thereof to the starting material. Greater amount of catalyst can be used, if required for increasing the reaction rate. Normally preferred range is 0.1–20 wt. percent, particularly 0.2–10 wt. percent, to the starting material.

The above-named catalysts themselves can take any form such as powder, pellet, blocks, and the like, or may be bound to carriers such as inert, porous substance, for example, carbon, alumina, silica, etc.

According to the invention, upon practicing the reaction as described above, ε-caprolactam can be obtained from 2-nitrocyclohexanone and/or 2-nitrocyclohexene-1-ol, by single step.

The reaction of this invention can also be performed in the additional presence of a nitrogen-containing basic substance. Whereby occasionally the reaction rate is increased, and the yield of ε-caprolactam is also increased. Any nitrogen-containing basic compound or salt thereof, such as primary, secondary, and tertiary amines, salts thereof, quaternary ammonium compounds, ammonia, aqueous ammonia, etc., can be used in the present invention. Examples of specific compounds may be given as follows:

(1) Primary amines:
  Methylamine, ethylamine, isopropylamine, ethanolamine, isopropanolamine, isobutylamine, cyclohexylamine, aniline, hexamethylenediamine, etc.
(2) Secondary amines:
  Dimethylamine, diethylamine, di-isopropylamine, diethanolamine, piperazine, diphenylamine, etc.
(3) Tertiary amines:
  Trimethylamine, triethylamine, triethanolamine, tribenzylamine, pyridine, etc.
(4) Amine salts:
  Organic acid or inorganic acid salts etc. of the foregoing (1)–(3) amines
(5) Quaternary ammonium salts:
  Tetramethylammonium-chloride, -bromide,
  Tetraethylammonium-chloride, -bromide
  Trimethylphenylammonium-chloride, -bromide, etc.
(6) Quaternary ammonium hydroxides:
  Tetramethylammonium hydroxide
  Tetraethylammonium hydroxide
  Triethylbenzylammonium hydroxide, etc.
(7) Ammonia or aqueous ammonia
(8) Aci-ammonium salt of an organic nitro compound such as aci-2-nitrocyclohexanone ammonium or N-substituted ammonium salt such as aci-2-nitrocyclohexanone N-methylammonium
(9) Ammonium salts of organic or inorganic weak acids:
  Ammonium carbonate, ammonium bicarbonate, ammonium borate, ammonium phosphate, ammonium acetate, ammonium oxalate, ammonium formate, etc.

Among the foregoing amines, salts thereof, and quaternary ammonium compounds of (1) through (6), those which are at least partially soluble in the liquid medium employed in the reaction are preferred. When those amines, salts thereof or quaternary ammonium compounds, inter alia, the amines, are added to the reaction systems employing aforesaid aromatic hydrocarbons, as the liquid media, ε-caprolactam can be obtained at high yield. Also ammonia and aqueous ammonia of (7) and aci - 2 - nitrocyclohexanone ammonium of (8) above are particularly preferred additives, since they generally improve ε-caprolactam yield, regardless of the type of liquid medium employed. The ammonium salts of weak acids given in (9) above are also preferable.

Those nitrogen-containing basic substances give favorable result, when added generally in the amount of 0.1–3 mols per mol of 2-nitrocyclohexanone and/or 2-nitrocyclohexene-1-ol. Obviously the above quantitative range is not critical, it being allowable to use or more of the basic substance.

The aci-2-nitrocyclohexanone ammonium is a novel compound expressed by the following formula

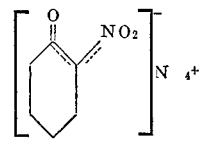

This compound can be used alone as the starting material in the present invention or may be used in conjunction with 2-nitrocyclohexanone and/or 2-nitrocyclohexane-1-ol.

When aci-2-nitrocyclohexanone ammonium is added to the liquid medium used in the present invention, the molar ratio of the nitrogen-containing basic compound and 2-nitrocyclohexanone and/or 2-nitrocyclohexene-1-ol is calculated by regarding it as a mixture of 2-nitrocyclohexanone and ammonia in equimolar proportion. The same calculation is made when aci-2-nitrocyclohexanone N-substituted ammonium is used.

We have found that the above-mentioned novel compound, aci-2-nitrocyclohexanone ammonium can be prepared by reacting 2-nitrocyclohexanone and/or 2-nitrocyclohexene-1-ol and ammonia in the absence of a solvent or in a substantially anhydrous inert organic solvent which does not dissolve the resulting aci-2-nitrocyclohexanone ammonium or hardly dissolves it, at a temperature above the freezing point of said solvent but below 50° C., preferably at a temperature in the range of 5 to 40° C. The above-mentioned inert inorganic solvent includes ethers and cyclic ethers such as ethyl ether, tetrahydrofuran and dioxane; alicyclic hydrocarbons such as cyclohexane and decalin; aliphatic hydrocarbons such as n-pentane, n-hexane and n-heptane; petroleum hydrocarbons such as petroleum ether and ligroin; aromatic hydrocarbons such as benzene, toluene and xylene; chlorinated hydrocarbons such as methylene chloride, chloroform, carbon tetrachloride and ethylene dichloride; ketones such as acetone, methyl ethyl ketone and cyclohexanone; fatty acid esters such as methyl formate and ethyl acetate; alcohols such as methyl alcohol, ethyl alcohol and isopropyl alcohol; and acetonitrile.

The amounts of these solvents to be used are not particularly restricted, but should preferably be twice to 20 times the weight of the 2-nitrocyclohexanone and/or enol form isomer. The amounts are preferably such that the resulting aci-2-nitrocyclohexanone ammonium is easy to separate. It is preferable that ammonia is usually used in a gaseous form. It is used in an amount equimolar to, or larger than, the 2-nitrocyclohexanone and/or 2-nitrocyclohexene-1-ol. But when a protic compound (for instance, water and alcohol) is present in the reaction system as said solvent or contained therein, it is necessary to use ammonia in an amount not exceeding an equimolar amount to the 2-nitrocyclohexanone and/or 2-nitrocyclohexene-1-ol.

The reaction practiced in the invention can be specifically explained herein below. Usually, 2-nitrocyclohexanone and/or enol form isomer thereof, liquid medium, and an active hydrogenation catalyst are introduced into a pressure vessel, and thereafter hydrogen is introduced thereinto at an elevated pressure. In case the nitrogen-containing basic substance is to be added, it is dissolved or dispersed in the liquid medium in advance. Or the addition may be effected by advance formation of salt of 2-nitrocyclohexanone and/or enol form isomer thereof with ammonium or amine, i.e., aci-2-nitrocyclohexanone ammonium, or aci-2-nitrocyclohexanone N-substituted ammonium.

Thereafter the system is heated under agitation, and reacted at 150°–300° C., preferably 200–280° C., normally for several minutes to several hours, preferably 30 minutes to about 3 hours. The reaction time is variable depending on the reaction rate. The reaction can be performed either batchwise or continuously.

When the reaction temperature in the present invention is 150–220° C., the reaction time (H) at these temperatures should preferably be controlled to satisfy the following relation, $$H > 280 - t$$

preferably, $$H \geq 285 - t$$

wherein

H is a heating time in minute at a temperature in the range of 150 to 220° C.; and, $t$ is a reaction temperature in Celsius within the range of 150–220° C.

if a high yield of the resulting ε-caprolactam is desired. By so doing, the intended ε-caprolactam can be obtained as a principal reaction product. When the reaction temperature exceeds 220° C., such a manipulation regarding the reaction time is of no great significance.

After the reaction, the reaction mixture is cooled as it is, and thereafter hydrogen and ammonia or other amine in the reaction system are discharged. Or, the reaction mixture is discharged into a low pressure zone while it is still hot, and wherein cooled while discharging hydrogen, ammonia or amine, and a part of liquid medium in the reaction system. Thereafter the catalyst is separated by optional known means such as filtration, centrifuge, etc. The residual reaction liquid may be distilled as it is, or extracted or recrystallized, to isolate ε-carprolactam.

The above-mentioned extraction can be effected, for example, by the steps of further distilling off all or substantially all of the liquid medium from the residual reaction liquid, dissolving the resulting residue in water to separate water-insoluble product, and thereafter extracting ε-caprolactam with an organic solvent such as chloroform and ether which is a good solvent for ε-caprolactam but is a poor solvent for other by-products. The so obtained crude ε-caprolactam can be further distilled or recrystallized.

As the recrystallization method, for example, the following can be employed. After eliminating the liquid medium completely or substantially completely from the radidual reaction liquid containing ε-caprolactam, the residue is added to a good solvent for ε-caprolactam, which however is a poor solvent for other side products, such as cyclohexane, benzene, toluene, or ethylene dichloride, while the residue is still hot. The insoluble by-products are removed by an optional means such as filtration, and the remaining system is cooled as it is. The so precipitated ε-caprolactam is subsequently separated and recovered. It is of course permissible to repeat the foregoing recrystallization procedure twice or even more times.

The thus separated by-products include ε-aminocaproic acid, ε-aminocaproic acid amide, and oligomers thereof. According to the invention, such by-products can be re-used as added to the starting material, together with the ammonia or amine and liquid medium which are discharged from the reaction mixture.

Under the foregoing procedures, 2-nitrocyclohexanone (keto form) and/or 2-nitrocyclohexene-1-ol (enol form) as the starting material is directly reacted with hydrogen in industrially readily available liquid media such as water, lower aliphatic alcohols, ethers, aromatic hydrocarbons, and mixtures thereof, to produce ε-caprolactam by a single-stage process in accordance with the subject invention. When the conditions are suitably selected, ε-caprolactam can be formed with a yield as high as approximately 90%, without forming ammonium sulfate as by-products.

Hereinafter the working examples of the invention are given by way of illustration, it being understood that the scope of this invention is in no way limited thereby.

The catalysts used in the examples were prepared in accordance with the procedures given in the following publications.

Raney nickel:
    W-7 Method—
        H. Adkins and H. R. Billica, J. Am. Chem. Soc., 70, 695 (1948).
    T-4 Method—
        S. Nishimura and Y. Urushibara, Bull. Chem. Soc. Japan, 30, 199 (1957).

Nickel boride:
    P. Paul, D. Buisson, and N. Joseph, Ind. Eng. Chem., 44, 1006 (1952).

Urushibara nickel:
    U-Ni-B—
        Y. Urushibara and S. Nishimura, Bull. Chem. Soc. Japan, 27, 480 (1954).

Reducing nickel:
    W. E. Bratt, J. Phys. Chem., 34, 2711 (1930).

Nickel formate:
    D. P. Dobychin et al., J. Phys. Chem. (U.S.S.R.), 13, 1367 (1939).

Urushibara cobalt:
    U-Co-B—
        S Saito, J. Pharm. Soc. Japan, 76, 351 (1956).

Raney cobalt:
    A. J. Chadwell, Jr. and K. Q. Smith, J. Phys. Chem. 60, 1339 (1956).

Colloidal palladium:
    A. Skita and W. A. Meyer, Ber., 45, 3579 (1912).

Colloidal platinum:
    A. Skita and W. A. Meyer, Ber., 45, 3579 (1912).

Rhodium-platinum:
    S. Nishimura and H. Taguchi, Bull. Chem. Soc. Japan, 36, 873 (1963).

Colloidal iridium:
    W. P. Dunworth and F. F. Nord, J. Am. Chem. Soc., 72, 4197 (1950).

Osmium black:
    H. C. Brown and C. A. Brown, J. Am. Chem. Soc., 84, 1494 (1962).

Raney iron:
    L. Kh. Freidlin, K. G. Rudneva and A. S. Sultanov, I. Akad, Nauk U.S.S.R., Otdl. Khim. Nauk, 511 (1954).

Raney copper:
    J. A. Stanfield and P. E. Robbins, Acetes congr. intern. catalyse, 2e, Paris, 1960, 2, 2579-97.

The stabilized nickel, palladium-carbon, palladium black, palladium oxide, platinum-carbon, platinum-black, platinum oxide, rhodium-carbon, ruthenium-carbon, and Adkins' type copper-chromite catalyst used in the examples are those usually available commercially.

EXAMPLE 1

An autoclave of 380-ml. capacity was charged with 4.29 g. (0.03 mol) of a mixture of 2-nitrocyclohexanone and its enol form isomer (keto form, 80%; enol form, 20%), 0.91 g. of 28% aqueous ammonia (0.015 mol as $NH_3$), 138 g. of water and 0.215 g. of a stabilized nickel catalyst (nickel-diatomaceous earth catalyst containing 50% of nickel), and into which hydrogen was introduced to an initial pressure of 40 kg./cm.$^2$. The system was heated with agitation from room temperature to 225° C. over period of 40 minutes, and for additional 3 hours at 225° C. under a pressure of 63 kg./cm.$^2$.

The reaction product was quenched so that hydrogen and a part of ammonia were discharged therefrom, and thereafter the catalyst was filtered off. The solvent was removed by reduced pressure distillation. Thus 3.5 g. of a crude crystalline product was obtained.

The crystal was extracted with 200 ml. of chloroform at room temperature, and after distilling off the chloroform. The crystal was again extracted with ethyl ether at room temperature. After distilling off the ethyl ether, 2.30 g. of white crystal was obtained. Its infrared spectrum corresponded perfectly with that of ε-caprolactam.

The yield of crude lactam was 68%.

EXAMPLE 2

An autoclave of 380-ml. capacity was charged with 13.08 g. (0.0914 mol) of 2-nitrocyclohexanone, 10.38 g. of 30% aqueous ammonia (0.183 mol as $NH_3$), 175 g. of deionized water of pH 5.8, and 2.5 g. of developed Raney nickel (W-7), and into which hydrogen was introduced to an initial pressure of 80 kg./cm.$^2$. The system was agitated for 20 minutes at room temperature, heated to 280° C. during the subsequent an hour and 40 minutes with the agitation continued, and maintained at the temperatures of 280° C. and a pressure of 120 kg./cm.$^2$ for additional an hour and 40 minutes. The resulting reaction mixture was let stand to cool off while discharging hydrogen and ammonia. The catalyst was removed from the reaction mixture by filtration, and water and distilled off under a reduced pressure. The residue was also subjected to a reduced pressure distillation, and the main fraction of distillate was obtained at B.P. 92° C./0.5 mm. Hg. The distillate was identified as ε-caprolactam, from the results of infrared spectrum analysis and gas chromatography. The yield of ε-caprolactam was 4.0 g., which corresponds to 35 mol percent yield to the starting 2-nitrocyclohexanone.

EXAMPLE 3

An autoclave of 380-ml. capacity was charged with 5.13 g. (0.0358 mol) of 2-nitrocyclohexanone (100% keto form), 6.54 g. of 28% aqueous ammonia (0.107 mol as $NH_3$), 124 g. of water, and 1.0 g. of Urushibara cobalt-B, and the system was heated under agitation at an initial hydrogen pressure of 39 kg./cm.$^2$. The reaction was completed after the heating at 250° C. for 3 hours.

The catalyst was filtered off from the reaction mixture, and then water content was reduced to approximately 50 ml. by reduced pressure distillation. ε-Caprolactam was extracted from the residue with 200 ml. of chloroform. Upon distilling off the chloroform, 2.57 g. of crude ε-caprolactam crystal was obtained, which had a purity of 91.8% as confirmed by gas chromatography determination. Consequently, the yield of pure ε-caprolactam was 58%.

EXAMPLE 4

An autoclave of 300-ml. capacity was charged with 5.5 g. (0.038 mol) of a mixture of 2-nitrocyclohexanone and its enol form isomer (keto form, 20%; enol form, 80%), 4.6 g. of 28% aqueous ammonia (0.076 mol as $NH_3$), 165.7 g. of water, and 1.2 g. of nickel boride catalyst, and into which hydrogen was introduced to an initial pressure of 40 kg./cm.$^2$. The system was heated at 250° C. for 3 hours under agitation.

From the reaction product, the catalyst was removed, and water was distilled off under a reduced pressure. The remaining solid was extracted 5 times with each 200 ml. of boiling ethyl ether. Distilling the ethyl ether off, 3.25 g. of crude, crystalline ε-caprolactam was obtained. A gas-chromatographic analysis indicates that the product had a purity of 89%. Consequently, the yield of ε-caprolactam was 67%.

EXAMPLE 5

An electromagnetic agitation-type autoclave of 1-liter capacity was charged with 4.29 g. (0.03 mol) of a mixture of 2-nitrocyclohexanone and 2-nitrocyclohexene-1-ol (keto form, 80%; enol form, 20%), 1.83 g. of 28% aqueous ammonia (0.03 mol as ammonia), 138 ml. of water, and 2.15 g. of a palladium-carbon catalyst (palladium content, 5%), and into which hydrogen was supplied to an initial pressure of 3 kg./cm.$^2$. Then the system was reacted at 225° C. for 3 hours under agitation. After filtering off the catalyst from the reaction product, water content was reduced to approximately 50 ml. by reduced pressure distillation. ε-Caprolactam was extracted from the remaining product with benzene. After repetitive recrystallization from benzene, totalling 1.8 g. of crystalline ε-caprolactam was obtained. The yield was 53%.

EXAMPLES 6–15

In substantially the same manner as described in Example 1, 2-nitrocyclohexanone and/or 2-nitrocyclohexene-1-ol were reduced to lactam in aqueous solvent, under various conditions as specified in Table 1. The results are also given in the same table. The reactor employed was a 300-ml. capacity SUS 32 stainless steel autoclave.

TABLE 1

| Example No. | grams | (mol) | Basic substance (grams) | Catalyst (grams) | Water, (grams) | Initial $H_2$ pressure, kg./cm.$^2$ | Reaction temperature, °C. | Reaction time, hr. | Lactam yield, grams (mol percent) | Analysis method, Example No. |
|---|---|---|---|---|---|---|---|---|---|---|
| 6 | 5.50 | (0.038) | 28% aqueous ammonia (4.6) | Stabilized Ni (0.6) | 165.7 | 48 | 160 | 1½ | 0.65 (15) | Same as 1. |
| 7 | 7.16 | (0.05) | 28% aqueous ammonia (30.4) | Raney Ni (W-7) (1.5) | 68.1 | 50 | 150 | 3.0 | 1.84 (33) | Same as 1. |
| 8 | 14.31 | (0.1) | 30% aqueous ammonia (56.76) | Raney Ni (T-4) (3.0) | 32.8 | 50 | 200 | 3.0 | 2.83 (25) | Same as 2. |
| 9 | 5.50 | (0.038) | 28% aqueous ammonia (4.6) | Stabilized Ni (0.215) | 165.7 | 47 | 220 | 1½ | 1.20 (28) | Same as 4. |
| 10 | 4.29 | (0.03) | 28% aqueous ammonia (9.13) | 5% Pt-carbon (0.215) | 128.4 | 40 | 225 | 3.0 | 1.82 (53) | Same as 1. |
| 11 | 4.29 | (0.03) | do | 5% Pd-carbon (0.215) | 128.4 | 40 | 225 | 3.0 | 1.9 (56) | Same as 4. |
| 12 | 4.29 | (0.03) | None | Stabilized Ni (0.215) | 139 | 42 | 225 | 3.0 | 1.30 (38) | Same as 3. |
| 13 | 13.08 | (0.0914) | 30% aqueous ammonia (10.38) | Nickel boride (2.5) | 175 | 80 | 280 | 1⅔ | 4.0 (35) | Same as 1. |
| 14 | 4.29 | (0.03) | 28% aqueous ammonia (18.3) | 5% Pd-carbon (0.215) | 120 | 40 | 300 | 3.0 | 0.24 (7) | Same as 4. |
| 15 | 4.29 | (0.03) | 28% aqueous ammonia (9.13) | Stabilized Ni (0.215) | 120 | 40 | 300 | 3.0 | 0.24 (7) | Same as 1. |

EXAMPLES 16-33

The reaction of Examples 16-33 was conducted under the conditions specified below, with the catalyst varied in each run. The analysis of the reaction product was performed in the same manner as described in Example 1.

Starting material:
    2-nitrocyclohexanone (100% keto form), 4.29 g. (0.03 mol)
Solvent:
    Water (deionized water of pH 5.8), 139.0 g.
Initial hydrogen pressure:
    50 kg./cm.$^2$
Time required for heating to the reaction temperature:
    30-40 minutes
Reaction temperature and time:
    225° C.±5° C., 3 hours
Additive:
    Ammonia (28% aqueous ammonia)
Reactor:
    SUS 32 stainless steel electromagnetic agitation-type autoclave of 300-ml. capacity

EXAMPLE 38

An autoclave of 300-ml. capacity was charged with 4.29 g. (0.03 mol) of a mixture of 2-nitrocyclohexanone and its enol form isomer, 0.511 g. (0.03 mol) of ammonia, 139 g. of isopropyl alcohol, and 0.215 g. of palladium-carbon catalyst (Pd content, 5 wt. percent), and hydrogen was introduced thereinto to obtain an intial pressure of 38 kg./cm.$^2$. The reaction was conducted as 150° C. for 3 hours. The reaction mixture was treated similarly to Example 33, to produce 1.29 g. of ε-caprolactam. The yield was 38%.

EXAMPLES 39-50

The catalytic hydrogenation reaction was performed under the conditions specified below, with the liquid medium (solvent) varied in each run. The analysis of the reaction product was performed similarly to Example 33.

Starting material:
    2-nitrocyclohexanone (100% keto form), 4.29 g. (0.03 mol)
Catalyst:
    Nickel-diatomaceous earth catalyst (Ni; 50%), 0.215 g.

TABLE 2

| Example No. | Catalyst Type | Catalyst Amount (g.) | NH$_3$/2-nitro-cyclo-hexanone (mol/mol) | Lactam formed (g.) | Lactam yield (mole percent) |
|---|---|---|---|---|---|
| 16 | Rh-carbon | 0.215 | 3 | 1.9 | 56 |
| 17 | Ru-carbon | 0.215 | 3 | 1.8 | 53 |
| 18 | Colloidal Ir | [1] 0.09 | 3 | 1.9 | 56 |
| 19 | Osmium black | 0.86 | 3 | 1.1 | 32 |
| 20 | Raney iron | 2.2 | 3 | 0.26 | 8 |
| 21 | Raneycopper | 1.7 | 4 | 1.1 | 32 |
| 22 | Adkins' copper-chromite catalyst | 0.43 | 5 | 1.8 | 53 |
| 23 | Urushibara nickel | [2] 0.5 | 1 | 1.8 | 53 |
| 24 | Reduced nickel | 0.43 | 1 | 1.7 | 50 |
| 25 | Raney cobalt | [3] 0.86 | 3 | 1.9 | 56 |
| 26 | Palladium black | 0.215 | 3 | 1.9 | 56 |
| 27 | Palladium oxide | 0.215 | 3 | 1.9 | 56 |
| 28 | Platinum black | 0.215 | 3 | 1.8 | 53 |
| 29 | Platinum oxide | 0.215 | 3 | 1.7 | 50 |
| 30 | Nickel formate | 0.86 | 3 | 1.8 | 53 |
| 31 | Colloidal palladium | 0.43 | 4 | 1.9 | 56 |
| 32 | Colloidal platinum | 0.43 | 4 | 1.7 | 50 |
| 33 | Rh-Pt | 0.215 | 3 | 1.8 | 53 |

[1] As Ir.
[2] As Ni.
[3] As Co.

EXAMPLES 34-37

ε-Caprolactam was prepared by catalytic reduction of 2-nitrocyclohexanone and/or 2-nitrocyclohexene-1-ol in dioxane solvent, under various conditions as specified in Table 3 below. The reactor employed was a 300-ml. capacity SUS 32 stainless steel autoclave.

Initial hydrogen pressure:
    45 kg./cm.$^2$
Time required for heating to the reaction temperature:
    30-40 minutes
Reaction temperature and time:
    225° C.±5° C., 3 hours
Reactor:
    SUS 32 stainless steel, electromagnetic agitation-type autoclave, capacity; 300 ml

TABLE 3

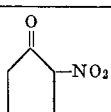

| Example No. | grams (mol) | Basic substance, type | Catalyst, type (g) | Dioxane, g. | Initial H$_2$ pressure, kg./cm.$^2$ | Reaction temperature, ° C. | Reaction time, (hr.) | Lactam yield, gram (mol percent) | Analysis method (Example No.) |
|---|---|---|---|---|---|---|---|---|---|
| 34 | 14.31 (0.1) | NH$_3$ ((17.03) | Raney Co (3) | 110.1 | 100 | 200 | 3.0 | 8.0 (71) | Same as 33. |
| 35 | 7.16 (0.05) | NH$_3$ (8.52) | Raney Ni (T-4) (1.5) | 165 | 50 | 275 | 3.0 | 0.72 (13) | Same as 1. |
| 36 | 5.5 (0.0384) | NH$_3$ (2.0) | Stabilized Ni (0.6) | 169 | 40 | 225 | 3.0 | 3.7 (86) | Same as 4. |
| 37 | 5.5 (0.0384) | NH$_3$ (2.0) | Stabilized Ni (0.6) | 169 | 40 | 200 | 1½ | 0.7 (13) | Same as 4. |

| Example No. | Solvent Type | Solvent Amount (grams) | NH₃/2-nitro-cyclohexanone (mol/mol) | Lactam formed (grams) | Lactam yield (mol percent) |
|---|---|---|---|---|---|
| 39 | Benzene | 139.0 | 0 | 0.27 | 8 |
| 40 | do | 139.0 | 1 | 2.35 | 69 |
| 41 | Toluene | 139.0 | 5 | 2.3 | 68 |
| 42 | Xylene | 139.0 | 5 | 2.1 | 62 |
| 43 | Pseudocumene | 139.0 | 5 | 1.9 | 56 |
| 44 | Di-isopropyl ether | 139.0 | 3 | 2.4 | 71 |
| 45 | Ethylene glycol | 139.0 | 3 | 2.0 | 59 |
| 46 | 50% aqueous methanol solution | 139.0 | 4 | 1.9 | 56 |
| 47 | 50% aqueous dioxane solution | 139.0 | 5 | 2.1 | 62 |
| 48 | Water of pH 3.0 | 139.0 | 0 | 1.0 | 29 |
| 49 | Tetrahydrofuran | 139.0 | 3 | 2.1 | 62 |
| 50 | Methanol | 139.0 | 0 | 2.21 | 65 |

EXAMPLE 51

A 380 ml. autoclave was charged with 4.80 g. (0.03 mol) of aci-2-nitrocyclohexanone ammonium, 139 g. of water and 0.215 g. of a stabilized nickel catalyst, and hydrogen was introduced to a pressure of 40 kg./cm.². While stirring, the reaction mixture was heated from 22° C. to 225° C. over a period of 35 minutes, and then reacted for 3 hours at 225° C. The reaction mixture was treated in the same manner as in Example 1 to give 2.21 g. of ε-caprolactam. The yield was 65%.

The aci-2-nitrocyclohexanone ammonium used in this example was prepared in accordance with the following procedure.

A mixture of 2-nitrocyclohexanone and 2-nitrocyclohexene-1-ol (80% of keto form and 20% of enol form) in an amount of 41.8 g. was dissolved into 400 ml. of ethyl ether, and ammonia gas was introduced at room temperature. The resulting precipitate was filtered, and washed two times with 20 ml. of ethyl ether, followed by drying in vacuo. There was obtained 44.5 g. of aci-2-nitrocyclohexanone ammonium. The yield was 95.8%. The elemental analysis showed the following results.

$C_6H_{12}O_5N_2$

Calculated (percent): C, 44.99; H, 7.55; N, 17.49.
Found (percent): C, 45.20; H, 7.41; N, 17.25.

EXAMPLE 52

A 380 ml. autoclave was charged with 2.15 g. (0.015 mol) of 2-nitrocyclohexanone (keto/enol mixture), 2.40 g. (0.15 mol) of aci-2-nitrocyclohexanone ammonium, 139 g. of deionized water having a pH of 5.8, and 0.215 g. of stabilized nickel. At an initial hydrogen pressure of 40 kg./cm.², the reaction mixture was heated while stirring. The reaction mixture was stirred further for 3 hours at 225° C. to complete the reaction. The reaction mixture was treated in the same manner as in Example 1 to give 2.21 g. of ε-caprolactam. The yield was 65%.

The aci-2-nitrocyclohexanone ammonium used in this example was prepared in accordance with the following procedure.

Into 50 ml. of methanol was added 22.8 g. of 2-nitrocyclohexanone. While cooling the solution with ice, ammonia gas corresponding to an amount of 2.71 g. was gradually introduced thereinto. The resulting precipitate was filtered, and washed twice with 50 ml. of ether, followed by drying. There was obtained 24.5 g. of aci-2-nitrocyclohexanone. The yield was 96.8%.

EXAMPLE 53

A 380 ml. autoclave was charged with 2.15 g. (0.015 mol) of a mixture of 2-nitrocyclohexanone and its enol-type isomer, 2.40 g. (0.015 mol) of aci-2-nitrocyclohexanone ammonium, 139 g. of methanol, and 0.215 g. of a platinum-carbon catalyst (containing 5% by weight of platinum). Hydrogen was introduced to a pressure of 39 kg./cm.², and the reaction mixture was heated for 3 hours at 225° C. while stirring. At the end of the reaction, the catalyst was removed by filtration, and the methanol was also removed by distillation under reduced pressure. There was obtained 3.50 g. of a product containing crystals. Further distillation of this product under reduced pressure gave 2.63 g. of ε-caprolactam. The yield was 78%.

The aci-2-nitrocyclohexanone ammonium used in this example was prepared in accordance with the following procedure.

Into a gaseous ammonium stream was sprayed 14.3 g. of 2-nitrocyclohexanone (a mixture of 40% keto form and 60% enol form). The obtained solid (16.0 g.) was washed twice with ether to give 13.4 g. of aci-2-nitrocyclohexanone ammonium. The yield was 83.8%. 2-nitrocyclohexanone was recovered from the ether washing, and ε-nitrocaproic acid amide was detected as a by-product.

EXAMPLE 54

A mixture (14.31 g.; 0.01 mol) of 2-nitrocyclohexanone and 2-nitrocyclohexene-1-ol was dissolved into 200 ml. of ethyl ether. Ammonia gas was introduced into the solution while cooling it with ice. The resulting precipitate was filtered, and washed with ethyl ether, followed by drying in vacuo. There was obtained 16.75 g. of aci-2-nitrocyclohexanone monomethyl ammonium. The yield was 96.2%.

The elemental analysis gave the following results.

$C_9H_{14}N_2O_3$

Calculated (percent): C, 48.26; H, 8.10; N, 16.08.
Found (percent): C, 47.92; H, 8.21; N, 16.24.

A 300 ml. autoclave was charged with 5.23 g. (0.03 mol) of the obtained aci-2-nitrocyclohexanone monomethyl ammonium, 139.0 g. of water, and 0.22 g. of a stabilized nickel catalyst. With the initial hydrogen pressure maintained at 41 kg./cm.², the reaction mixture was reacted for 3 hours at 225° C. There was obtained 0.95 g. of ε-caprolactam. The yield was 28%.

EXAMPLES 55–64

Catalytic conversion of aci-2-nitrocyclohexanone ammonium into lactam was conducted under various conditions given in Table 5 below. The results obtained are also given in Table 5. The reaction vessel used was a 380 ml. SUS–28 autoclave. The analysis was performed by solvent extraction, distillation, gas-chromatography, etc.

TABLE 5

| Ex. No. | Aci-2-nitrocyclohexanone ammonium, grams (mol) | Liquid medium (grams) | Ammonia (grams) | Catalyst (grams) | Initial H pressure, (kg./cm.$^2$) | Reaction temperature, °C. | Reaction time, hr. | Yield of lactam, grams (mol percent) |
|---|---|---|---|---|---|---|---|---|
| 55 | 8.01(0.05) | Water (70.3) | 28% aqueous ammonia (27.4) | Developed Raney nickel (W-7) (1.5) | 50 | 150 | 3 | 1.84(33) |
| 56 | 4.805(0.03) | Water (162.0) | None | 5% Pd-carbon (0.24) | 40 | 240 | 3 | 2.72(80) |
| 57 | 16.01(0.1) | Water (185.0) | do | Developed Raney nickel (T-4) (2.5) | 80 | 280 | 1½ | 4.64(41) |
| 58 | 4.80(0.03) | Methanol (139.0) | do | Developed Raney cobalt (0.215) | 39 | 225 | 3 | 2.63(78) |
| 59 | 4.80(0.03) | Isopropanol (139.0) | do | 5% Pt-carbon (0.215) | 40 | 150 | 3 | 1.29(38) |
| 60 | 6.404(0.04) | Dioxane (176.0) | Liquid ammonia (1.36) | Stabilized nickel (0.62) | 40 | 225 | 3 | 3.85(71) |
| 61 | 4.80(0.03) | Benzene (139.0) | None | Developed Raney cobalt (0.215) | 41 | 225 | 3 | 2.40(71) |
| 62 | 4.80(0.03) | do | Liquid ammonia (1.70) | do | 40 | 225 | 3 | 2.64(78) |
| 63 | 4.80(0.03) | Tetrahydrofuran (139.0) | Liquid ammonia (5.10) | 5% Pd-carbon (0.215) | 42 | 150 | 3 | 1.32(39) |
| 64 | 8.01(0.05) | Dioxane (165.0) | Liquid ammonia (8.52) | 5% Pt-carbon (0.30) | 50 | 275 | 3 | 0.68(12) |

EXAMPLE 65

An autoclave of 300-ml. capacity was charged with 4.29 g. (0.03 mol) of 2-nitrocyclohexanone (100% keto form), 9.1 g. (0.09 mol) of triethylamine, 139.0 g. of benzene, and 0.215 g. of nickel-diatomaceous earth catalyst (Ni; 50%), and into which hydrogen was introduced to obtain an initial pressure of 45 kg./cm.$^2$. The system was heated under agitation for 35 minutes until the temperature reached 225° C., and for additional 3 hours at 225° C. ±5° C. The reaction mixture was treated as in Example 4, to produce 1.53 g. of ε-caprolactam. The yield was 45%. This example shows the effect of triethylamine addition. When the above reaction was repeated except that the triethylamine addition was omitted, the yield of ε-caprolactam was only 8%.

EXAMPLES 66–71

Using the nitrogen-containing basic substances and their salts, the reaction was conducted under the following conditions. The results obtained are given in Table 6. The analysis of the reaction product was made in the same manner as in Example 3.

Starting material:
 2-nitrocyclohexane (100% keto form), 4.29 g. (0.03 mol)
Catalyst:
 Nickel-diatomaceous earth catalyst (Ni; 50%), 0.215 g.
Solvent:
 Deionized water having a pH of 5.8
Initial H$_2$ pressure:
 45 kg./cm.$^2$
Time needed to elevate the temperature to the reaction temperature:
 30–40 minutes
Reaction temperature:
 225° C.
Reaction time:
 3 hours
Reactor:
 380 ml. SUS 32 electromagnetic-stirring type autoclave

| Example No. | Nitrogen-containing basic substances or their salts, grams (mol) | Water, grams | Yield of lactam, grams (mol percent) |
|---|---|---|---|
| 66 | 40% aqueous solution of monomethyl amine, 7.0 (0.09) | 134.8 | 1.0(29) |
| 67 | Anilin hydrochloride, 11.7 (0.09) | 139.0 | 0.26(8) |
| 68 | 10% aqueous solution of tetramethyl ammonium hydroxide, 50 (0.055) | 94 | 0.49(14) |
| 69 | Diammonium phosphate, 1.98 (0.015) | 139.0 | 1.43(42) |
| 70 | Ammonium carbonate, 2.34 (0.03) | 139.0 | 1.80(53) |
| 71 | Ammonium acetate, 9.25 (0.12) | 139.0 | 1.70(50) |

We claim:
1. A process for the preparation of ε-caprolactam, which comprises contacting a member selected from the group consisting of 2-nitrocyclohexanone, 2-nitrocyclohexene-1-ol and mixtures thereof with hydrogen at temperatures ranging from 150° C. to 300° C., in the presence of at least one liquid medium selected from the group consisting of water, lower aliphatic alcohols, ethers of 4–8 carbons, and aromatic hydrocarbons of 6–10 carbons, and an active hydrogenation catalyst, and recovering ε-caprolactam from the resulting reaction mixture.

2. The process for the preparation of ε-caprolactam in accordance with claim 1, which comprises contacting a member selected from the group consisting of 2-nitrocylcohexanone, 2-nitrocyclohexene-1-ol and mixtures thereof with hydrogen at temperatures ranging from 150° C. to 300° C., in the presence of at least one liquid medium selected from the group consisting of water, lower aliphatic alcohols, ethers of 4–8 carbons and aromatic hydrocarbons, of 6–10 carbons (an active hydrogenation catalyst, and a nitrogen-containing basic substance, and recovering ε-caprolactam from the resulting reaction mixture.

3. The process of claim 2, in which the nitrogen-containing basic substance is ammonia or aqueous ammonia.

4. The process in accordance with claim 1, in which the starting material is contacted with hydrogen at temperatures ranging from 200° C. to 280° C.

5. The process in accordance with any of claims 1 through 4, in which the active hydrogenation catalyst is formed from at least one member of the group consisting of metals belonging to Group VIII of the Periodic Table, metallic compounds thereof which can form the metals in the reaction system, copper and copper-chromite catalyst.

6. The process in accordance with any of the foregoing claims 1 through 5, in which the active hydrogenation catalyst is formed of a member of the group consisting of nickel, cobalt, platinum, palladium, and compounds of those metals which can form nickel, cobalt, platinum or palladium in the reaction system.

7. The process in accordance with claim 1, in which the liquid medium is at least one member of the group consisting of water, monovalent and divalent aliphatic alcohols of 1–3 carbons, aromatic hydrocarbons of 6–8 carbons, and cyclic ethers of 4 carbons.

8. The process in accordance with claim 1, in which the liquid medium is selected from the group consisting of water and aqueous solutions of monovalent and divalent aliphatic alcohols of 1–3 carbons, which contains ammonia as a nitrogen-containing basic substance.

9. The process for the preparation of ε-caprolactam according to claim 1 wherein aci-2-nitrocyclohexanone ammonium is contacted with hydrogen in the presence of an active hydrogenation catalyst and at least one liquid medium selected from the group consisting of water, lower aliphatic alcohols, ethers having 4 to 8 carbon atoms and aromatic hydrocarbons having 6 to 10 carbon atoms at a temperature in the range from 150 to 300° C.

10. The process according to claim 2 wherein the nitrogen-containing basic substance is aci-2-nitrocyclohexanone ammonium.

11. The process according to claim 1 wherein when the reaction temperature is in the range of 150–220° C., the reaction time (H) is controlled to satisfy the following relation, $$H > 280 - t$$

preferably, $$H \geq 285 - t$$

wherein:
- H is a heating time in minute at a temperature in the range of 150 to 220° C.; and,
- $t$ is a reaction temperature in Celsius within the range of 150 to 220° C.

References Cited

UNITED STATES PATENTS 2,763,644  9/1956  Donaruma _____ 260—239.3

HENRY R. JILES, Primary Examiner

R. T. BOND, Assistant Examiner